(12) United States Patent
Kim et al.

(10) Patent No.: US 9,614,863 B2
(45) Date of Patent: Apr. 4, 2017

(54) SYSTEM AND METHOD FOR ANALYZING MOBILE CYBER INCIDENT

(71) Applicant: KOREA INTERNET & SECURITY AGENCY, Seoul (KR)

(72) Inventors: Byung Ik Kim, Seoul (KR); Tai Jin Lee, Seoul (KR); Youngsang Shin, Seoul (KR); Hong Koo Kang, Seoul (KR); Seul Gi Lee, Seoul (KR); Hyei Sun Cho, Seoul (KR)

(73) Assignee: KOREA INTERNET & SECURITY AGENCY, Seoul (KR)

( * ) Notice: Subject to any disclaimer, the term of this patent is extended or adjusted under 35 U.S.C. 154(b) by 59 days.

(21) Appl. No.: 14/602,633

(22) Filed: Jan. 22, 2015

(65) Prior Publication Data
US 2016/0205125 A1    Jul. 14, 2016

(30) Foreign Application Priority Data
Jan. 14, 2015 (KR) .......................... 10-2015-0006949

(51) Int. Cl.
*G06F 21/56* (2013.01)
*H04L 29/06* (2006.01)

(52) U.S. Cl.
CPC ...... *H04L 63/1425* (2013.01); *H04L 63/1416* (2013.01)

(58) Field of Classification Search
CPC .. G06F 21/51; G06F 21/554; G06F 2221/033; G06F 2221/2119; H04L 63/145; H04L 63/1483

USPC ....................... 726/23, 24; 709/224
See application file for complete search history.

(56) References Cited

U.S. PATENT DOCUMENTS

| | | | | |
|---|---|---|---|---|
| 2012/0324094 A1* | 12/2012 | Wyatt | .................... | H04W 4/003 709/224 |
| 2014/0181973 A1* | 6/2014 | Lee | ......................... | G06F 21/562 726/23 |
| 2015/0011186 A1* | 1/2015 | Yoon | ........................ | H04W 4/14 455/410 |
| 2015/0052612 A1* | 2/2015 | Wang | ..................... | G06F 21/561 726/24 |
| 2015/0067853 A1* | 3/2015 | Amrutkar | ............... | H04L 63/14 726/23 |
| 2015/0067854 A1* | 3/2015 | Kim | ..................... | H04L 63/1441 726/23 |

OTHER PUBLICATIONS

Lee, et al., A study on the Presumption of Same Attacker Using Mobile Malware Collection and Analysis Information, Digital Contents Society and Society of Mobile Technology, Dec. 13, 2014.

* cited by examiner

*Primary Examiner* — Sayed Beheshti Shirazi
(74) *Attorney, Agent, or Firm* — Cantor Colburn LLP

(57) ABSTRACT

A system and method for analyzing mobile cyber incidents that checks whether codes attacking the weaknesses of mobile users are inserted into collected URLs and whether applications are downloaded and automatically executed, without the agreement of users, so that if the mobile cyber incidents are analyzed through the manual analysis of a manager, the applications to be analyzed manually can be reduced.

5 Claims, 12 Drawing Sheets

SYSTEM AND METHOD FOR ANALYZING MOBILE CYBER INCIDENT

CROSS REFERENCE TO RELATED APPLICATION

The present application claims the benefit of Korean Patent Application No. 10-2015-0006949 filed in the Korean Intellectual Property Office on Jan. 14, 2015, the entire contents of which are incorporated herein by reference.

BACKGROUND OF THE INVENTION

Field of the Invention

The present invention relates to a system and method for analyzing mobile cyber incidents, and more particularly, to a system and method for analyzing mobile cyber incidents that checks whether codes attacking the weaknesses of mobile users are inserted into collected URLs and whether applications are downloaded and automatically executed, without the agreement of users.

Background of the Related Art

Recently, mobile terminal users have been drastically increased. The populations using mobile terminals in the first quarter of 2014 reach about 6.8 billion all over the world, and especially, the number of new mobile users in 2013 is 2 billion. The mobile terminal users are drastically increased because internet is freely used without any limitations in time and space and the friendliness among the users is improved through services like SNS. Further, they obtain many conveniences like financial service availability, free service coupons issuing and so on through simple procedures.

Recent mobile terminals, which provide conveniences through various applications and support fast internet services, are called 'smartphones'.

Such smartphones store and manage various kinds of personal information. That is, they store telephone numbers, text messages, bank account numbers for financial services, password numbers, authenticated certificates, card numbers and the like.

Like this, since the smartphones store various kinds of personal information therein, they may be attacked by hackers, but unfortunately, the smartphone users do not recognize the attacks from the hackers well.

According to Kaspersky Lab, PC and mobile malicious code analyzing company, the mobile malicious codes found in the second quarter of 2014 are 65,118, and the APK files installing the malicious codes are 727,790.

The malicious codes operating for mobile banking among the mobile malicious codes are 2,033. The number of total mobile malicious codes is lower than that in the first quarter of 2014, but the number of mobile banking malicious codes is greater by two times than in the first quarter of 2014. More than 90% of the mobile banking malicious codes are found in Russia, and even in Korea, 30 mobile banking malicious codes are detected.

Accordingly, the incidents using the mobile malicious codes have been increased, and they are handled with mobile vaccine. The mobile vaccine analyzes the mobile malicious codes, creates information for detecting the mobile malicious codes, transmits the information to a user, and provides a function of detecting the malicious codes. However, actually, most of mobile users do not use the mobile vaccine.

According to Korea Internet & Security Agency, it is investigated that only about 33.5% of the mobile terminal users adopt mobile vaccine. So as to make a vaccine signature detecting mobile malicious codes, specific information on the malicious codes should be extracted through manual analysis of analyzers. Further, a method for deleting the detected malicious codes should be found and sent to the user.

However, lots of systems for collecting the mobile malicious codes to be checked do not exist. At present, the mobile applications suspected on malicious behaviors are received from a user or the applications suspected in application market are collected. The systems for collecting the mobile malicious codes by means of the sharing of the application through downloading, black markets and blogs have been not sufficient. Accordingly, the attackers who spread the mobile malicious codes insert download link into web sites or connect application download addresses through SMS/MMS.

Moreover, the collected applications are analyzed directly by analyzers, and accordingly, the number of collected applications to be analyzed is limited. The system assisting the analysis has been recently developed as a tester, and further, the determination whether malicious behavior exists in the analyzed results of the system has to be made by the analyzers.

SUMMARY OF THE INVENTION

Accordingly, the present invention has been made in view of the above-mentioned problems occurring in the prior art, and it is an object of the present invention to provide a system and method for analyzing mobile cyber incidents that checks whether codes attacking the weaknesses of mobile users are inserted into collected URLs and whether applications are downloaded and automatically executed, without the agreement of users.

To accomplish the above-mentioned object, according to a first aspect of the present invention, there is provided a system for analyzing mobile cyber incidents, the system including: a mobile incident collection server collecting text messages sent through communication company servers to produce text message detection information, collecting URL information based on real-time search words provided by search portals to produce URL detection information, and collecting basic information of application files being sold in application market servers to produce APK detection information; a mobile incident analysis server having a URL analysis module checking whether codes attacking the weaknesses of mobile users are inserted into collected URLs or checking whether applications are downloaded and automatically executed, without the agreement of users, on the basis of the URL detection information collected by the mobile incident collection server to produce and provide URL analysis information and an application analysis module determining whether malicious behaviors exist on the basis of the APK detection information collected by the mobile incident collection server to produce and provide application analysis information; and an analysis information DB receiving the URL analysis information and the application analysis information produced by the mobile incident analysis server and storing and managing the information therein.

According to the present invention, preferably, the application analysis module performs mobile vaccine checking whether the existing malicious behaviors are detected in the applications collected by the mobile incident collection server, collects and provides malicious behavior detection vaccine information and detected name information according to the checking results, and performs the behavior analysis for the applications being normal on the behaviors as the checking results.

According to the present invention, preferably, the behavior analysis is the application analysis using a mobile terminal and the application analysis using an emulator.

According to the present invention, preferably, the URL analysis module includes: a URL call module receiving a URL list to be collected from the mobile incident collection server and, if collected URLs exist, analyzing the collected URLs; a crawler and header setting call module checking the terminal information approaching the URLs by using user agent information of header information of OS and calling pages different from each other; a URL web source crawling module crawling the URL web sources called by the crawler and header setting call module; a URL link extraction module detecting the URL link information of the web page sources crawled and performing the in-depth crawling for the corresponding URLs; an obfuscation checking and scoring module checking the maximum length of a single string, frequencies and entropy of specific characters, and the entropy of the whole function name and variable name, calculating the scores of the checked items, determining that the corresponding URLs are obfuscated if the corresponding page exceeds a critical value, setting the URL obfuscated as drive-by download page, and performing the dynamic checking for the URL; a hidden URL detection and extraction module detecting hidden URL as features of the drive-by download page attack; and an APK URL detection module analyzing whether the APK file downloaded by the visit to the corresponding URL through the web page source analysis exists, extracting the corresponding URL, analyzing the extracted URL information, extracting the corresponding URL if the final extension of the corresponding URL is APK, managing the corresponding URL in an URL index table, and managing the association relation of the corresponding URL with the original web page URL.

According to the present invention, preferably, the hidden URL detection and extraction module detects that a portion on which the URL link is displayed has a size of 0 or width×depth<=10 or that the connected window is not displayed.

According to the present invention, preferably, the URL analysis module includes: a URL to be checked call module calling the URL whose dynamic analysis is not performed from the collected URLs, the URL whose static analysis is finished, and the drive-by download URLs, calling the repeated URLs collected after the re-analysis limitation period from the repeatedly collected URLs, and performing the dynamic analysis for the called URLs; a URL management module checking whether the URLs for the dynamic analysis are the shortened URLs and managing the checked original URLs and the shortened URL information for the original URLs; an idle check module checking whether the emulator and terminal for the dynamic analysis of the URLs are idle; a system setting module transmitting the URL to be checked to the dynamic analysis instrument, activating Wi-Fi function in case of the mobile terminal, checking whether network is connected to a management system, and receiving the URL to be checked; a URL visit module calling the basic browser of the emulator or terminal, inputting the URL to be checked, activating all monitoring functions after the input of the URL, performing the connection of the URL, setting the emulator or terminal to apply no external manipulation thereto, and performing visiting to the URL; a monitoring result analysis module checking the visit to the URL and transmitting the values of the monitoring results to the management system; an initialization module performing the initialization to the state before the visit if the extraction of the monitoring results is finished; and an APK file management module performing repetition collection checking whether the collected APK files are the same as the existing collected APK files, adding the URL visited and checked and the collection time to the existing APK collection traceability if the collected APK files are repeated, producing and managing APK index by using index table if the collected APK files are new, and producing collection information.

According to the present invention, preferably, the application analysis module includes: an APP to be visited and checked call module calling the APP produced from the APP collection result and URL/APP analysis result; an idle check module checking whether the emulator and terminal for the APP dynamic analysis are idle, first performing the analysis using the emulator, and next performing the analysis using the terminal if there is no idle emulator; a malicious rule information call/management module calling APP behavior malicious rule set by the manager and analyzing the APP behavior monitoring result; a system setting module transmitting the APP to be checked to the dynamic analysis instrument; a monitoring module checking the APP received from the management system, executing monitoring processes, and recording the information on all behaviors produced when the APP is installed or operated as log; a result analysis module transmitting the log produced from the monitoring processes after the APP analysis time is finished to the management system; a malicious index calculation module checking the malicious behaviors of the APP to be checked through mobile vaccine like VirusTotal and AndroTotal, obtaining external reputation information on the APP to be checked by using the detected results from the mobile vaccine, and calculating the malicious score; and an APP malicious detection and management module calculating the malicious score based on the malicious score calculated through one of the monitoring result and the mobile vaccine, recording and managing the calculated score in a DB, and providing the malicious detection result.

To accomplish the above-mentioned object, according to a second aspect of the present invention, there is provided a method for analyzing mobile cyber incidents, the method including the steps of: allowing a mobile incident analysis server to perform a JavaScript obfuscation check routine on the basis of the mobile cyber incident collection information collected by a mobile incident collection server; if a suspected URL is extracted through the JavaScript obfuscation checking routine, performing a corresponding URL visit checking emulator/terminal check and URL transmission routine by means of the mobile incident analysis server; performing a monitoring and produced APK detection/management routine for the URL visit checking emulator/terminal and the corresponding URL by means of the mobile incident analysis server; performing a selected check instrument confirmation and APP behavior analysis preparation routine by means of the mobile incident analysis server; performing a process monitoring routine according to the check instrument conformation and APP behavior analysis by means of the mobile incident analysis server; performing a file system and network monitoring routine for the file system and network in which monitoring is performed by means of the mobile incident analysis server; performing a monitoring result analysis routine by means of the mobile incident analysis server; and performing a mobile vaccine checking and result analysis routine by means of the mobile incident analysis server.

According to the present invention, preferably, the JavaScript obfuscation check routine includes the steps of: calculating the entropy of the whole string of the JavaScript collected by the mobile incident collection server; calculating the entropy of JavaScript function name and variable name; calculating the frequencies of specific characters of the whole string of the JavaScript; calculating the maximum length of the string; calculating the obfuscation score; and if the calculated obfuscation score is larger than a critical value, selecting the JavaScript string as the suspected URL.

According to the present invention, preferably, the URL visit checking emulator/terminal check and URL transmission routine includes the steps of: allowing the mobile incident analysis server to determine whether the URLs collected by the mobile incident collection server are the dynamic analysis standby URLs; if it is determined that the collected URLs are the dynamic analysis standby URLs, determining whether the URLs collected are existing analysis URLs; if it is determined that the URLs collected are existing analysis URLs, determining whether a re-analysis period is exceeded; if it is determined that the re-analysis period is exceeded setting the collected URLs as the dynamic visit check URLs; determining whether the dynamic visit check URLs are visitable emulators; if it is determined that the dynamic visit check URLs are visitable emulators, calling initial emulators and calling a monitoring module; and receiving the dynamic visit check URLs, starting system monitoring, and calling web browser and inputting the received URL.

According to the present invention, preferably, the URL visit checking emulator/terminal check and URL transmission routine further includes the steps of: if it is determined that the dynamic visit check URLs are not visitable emulators, determining whether the dynamic visit check URLs are visitable terminals; if it is determined that the dynamic visit check URLs are visitable terminals, initializing the terminals and calling the monitoring module; and receiving the dynamic visit check URLs, starting system monitoring, and calling web browser and inputting the received URL.

According to the present invention, preferably, the monitoring and produced APK detection/management routine includes the steps of: allowing the mobile incident analysis server to determine whether an initialization command is inputted from the outside; initializing the analysis environment for the emulator and terminal if it is determined that the initialization command is inputted to transform the corresponding analysis environment into the state where the visit to URL is possible; turning on the Wi-Fi function after the initialization of the analysis environment for the terminal and driving a network packet dump program; determining whether the visit time is exceeded; if it is determined that the visit time is not exceeded, transmitting the file produced as the monitoring result to the management system; determining whether the transmitted file corresponds to the received file in the management system, restoring the session of PCAP file if it is determined that the transmitted file corresponds to the received file, extracting the APK file in the PCAP file, and initializing the extracted emulator and terminal; determining whether the extracted APK file is the existing APK file; and if it is determined that the extracted APK file is not the existing APK file, applying ID to the extracted APK file and storing the file, extracting the basic information of the APK file, and adding the download address by ID of APK.

According to the present invention, preferably, the monitoring and produced APK detection/management routine further includes the step of: if it is determined that the extracted APK file is the existing APK file, adding the download information of the existing APK and adding the download address by ID of APK.

According to the present invention, preferably, the check instrument confirmation and APP behavior analysis preparation routine includes the steps of: allowing the mobile incident analysis server to determine whether the APK collected by the mobile incident collection server is dynamic analysis standby APK; if it is determined that the collected APK is dynamic analysis standby APK, determining whether the APK collected is existing analysis APK; if it is determined that the APK is the existing analysis APK, determining whether a re-analysis period is exceeded; if it is determined that the re-analysis period is exceeded, setting the collected APK as the dynamic analysis APK; determining whether the dynamic analysis APK is a visitable emulator; and if it is determined that the dynamic analysis APK is the visitable emulator, callings an initial emulator, calling a monitoring module, receiving the dynamic analysis APK, starting system monitoring, and installing and operating the APK.

According to the present invention, preferably, the check instrument confirmation and APP behavior analysis preparation further includes the step of: if it is determined that the dynamic analysis APK is not visitable emulator, determining whether the dynamic analysis APK is a visitable terminal, initializing the terminal if it is determined that the dynamic analysis APK is the visitable terminal, calling the monitoring module, receiving the dynamic analysis APK, starting system monitoring, and installing and operating the APK.

According to the present invention, preferably, the process monitoring routine includes the steps of: allowing the mobile incident analysis server to determine whether the emulator or terminal is connectable; if it is determined that the emulator or terminal is connectable, executing an analysis APP; checking the processor ID of the APP to be executed; and starting the monitoring for the behavior related to the processor on the basis of the processor ID of the APP checked, finishing the analysis APP, finishing the monitoring for the behavior related to the processor, extracting log and performing parsing, and updating the analysis result in the APK ID.

According to the present invention, preferably, the file system and network monitoring routine includes the steps of: allowing the mobile incident analysis server to determine whether the emulator or terminal is connectable; if it is determined that the emulator or terminal is connectable, checking the connection state of network and executing an analysis APP if it is checked that the network is connected; checking the processor ID of the APP executed; starting the monitoring for the file system or the behavior related to the network; and finishing the analysis APP, finishing the monitoring for the file system or the behavior related to the network, extracting log and PCAP and performing parsing, and updating the analysis result in the APK ID.

According to the present invention, preferably, the monitoring result analysis routine includes the steps of: allowing the mobile incident analysis server to call malicious rule information on the basis of the monitoring result of the APP analysis; determining whether malicious API and permission exist; and if it is determined that the malicious API and permission exist, performing the scoring by behavior, performing the scoring for the mobile vaccine check result, performing the scoring for the signature information, API and agreement analysis results, and determining whether the APP is malicious.

According to the present invention, preferably, the mobile vaccine checking and result analysis routine includes the steps of: allowing the mobile incident analysis server to check mobile vaccine API KET on the basis of the monitoring result of the APP analysis; and transmitting an APP hash value if it is checked that the mobile vaccine API KET is detected, parsing the result value, and storing and finishing the result value of the parsing in a DB.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENTS

Figure 1:
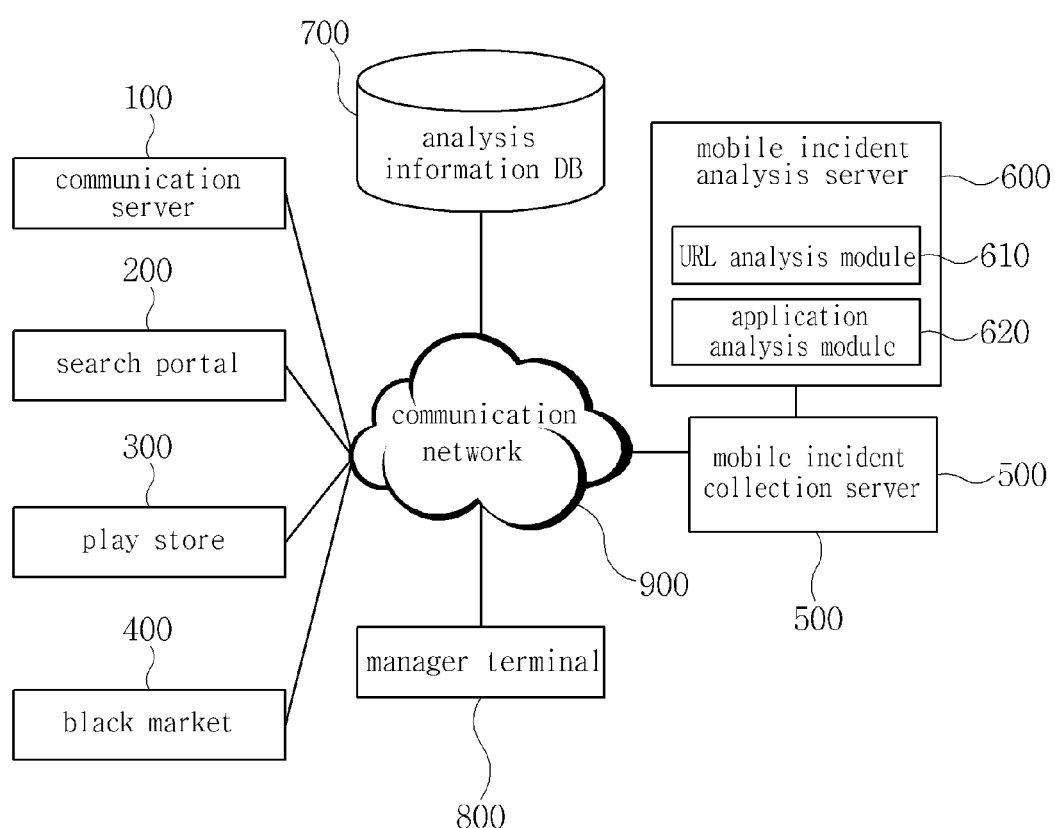
FIG. 1 is a block diagram showing a system for analyzing mobile cyber incidents according to the present invention.

Before the present invention is disclosed and described, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, if the terminologies used herein fail to accurately indicate the scope of the invention, they should be replaced with the terminologies understood correctly by those skilled in the art. Furthermore, the terminologies used herein should be interpreted according to the context under the definition of the dictionary, and accordingly, they are not interpreted as meaning reduced excessively.

The terminology used herein is for the purpose of describing particular embodiments only and is not intended to be limiting. The term 'a' or 'an', as used herein, are defining as one or more than one. The term 'including' and/or 'having', as used herein are intended to refer to the above features, numbers, steps, operations, elements, parts or combinations, and it is to be understood that the terms are not intended to preclude the presence of one or more features, numbers, steps, operations, elements, parts or combinations and added possibilities.

The present invention is disclosed with reference to the attached drawings wherein the corresponding parts in the embodiments of the present invention are indicated by corresponding reference numerals and the repeated explanation on the corresponding parts will be avoided. If it is determined that the detailed explanation on the well known technology related to the present invention makes the scope of the present invention not clear, the explanation will be avoided for the brevity of the description.

FIG. 1 is a block diagram showing a system for analyzing mobile cyber incidents according to the present invention.

As shown in FIG. 1, a system for analyzing mobile cyber incidents according to the present invention includes: communication servers 100, search portals 200, play stores 300, a mobile incident collection server 500, a mobile incident analysis server 600, an analysis information DB 700, a manager terminal 800 and a communication network 900.

The mobile incident collection server 500 collects text messages sent through the communication company servers 100 to produce text message detection information, collects URL information based on real-time search words provided by the search portals 200 to produce URL detection information, and collects basic information of application files being sold in application market servers like the play stores 300 and the black markets 400 to produce APK detection information.

The mobile incident analysis server 600 includes: a URL analysis module 610 checking whether codes attacking the weaknesses of mobile users are inserted into collected URLs or checking whether applications are downloaded and automatically executed, without the agreement of users, on the basis of the URL detection information collected by the mobile incident collection server 500 to produce and provide URL analysis information; and an application analysis module 620 determining whether malicious behaviors exist on the basis of the APK detection information collected by the mobile incident collection server 500 to produce and provide application analysis information.

The analysis information DB 700 receives the URL analysis information and the application analysis information produced by the mobile incident analysis server 600 and stores and manages the information.

The application analysis module 620 performs mobile vaccine checking whether the existing malicious behaviors are detected in the applications collected by the mobile incident collection server 500, collects and provides malicious behavior detection vaccine information and detected name information according to the checking results, and performs the behavior analysis for the applications being normal on the behaviors as the checking results.

In this case, the behavior analysis means the application analysis using mobile terminals and emulators.

Figure 2:
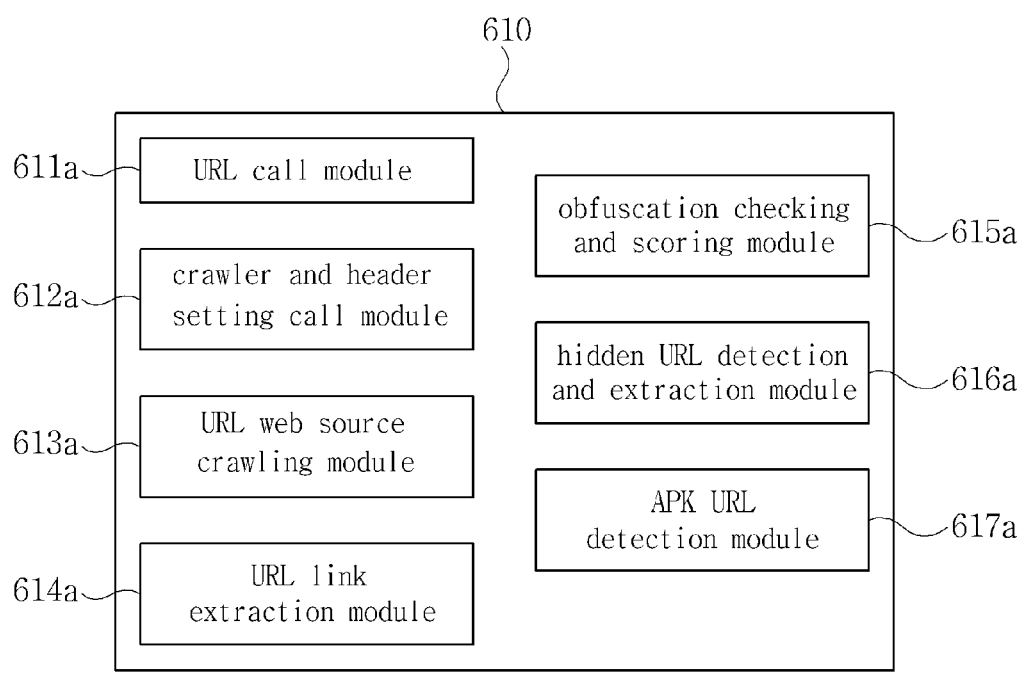
FIG. 2 is a block diagram showing the detailed configuration of a URL analysis module in FIG. 1.

FIG. 2 is a block diagram showing the detailed configuration of a URL analysis module in FIG. 1.

As shown in FIG. 2, the URL analysis module 610 includes: a URL call module 611a receiving a URL list to be collected from the mobile incident collection server 500 and, if collected URLs exist, analyzing the collected URLs; a crawler and header setting call module 612a checking the terminal information approaching the URLs by using user agent information of header information of OS and calling pages different from each other; a URL web source crawling module 613a crawling the URL web sources called by the crawler and header setting call module 612a; a URL link extraction module 614a detecting the URL link information of the web page sources crawled and performing the in-depth crawling for the corresponding URLs; an obfuscation checking and scoring module 615a checking the maximum length of a single string, frequencies and entropy of specific characters, and the entropy of the whole function name and variable name, calculating the scores of the checked items, determining that the corresponding URLs are obfuscated if the corresponding page exceeds a critical value, setting the URL obfuscated as drive-by download page, and performing the dynamic checking for the URL; a hidden URL detection and extraction module 616a detecting hidden URL as features of the drive-by download page attack; and an APK URL detection module 617a analyzing whether the APK file downloaded by the visit to the corresponding URL through the web page source analysis exists, extracting the corresponding URL, analyzing the extracted URL information, extracting the corresponding URL if the final extension of the corresponding URL is APK, managing the corresponding URL in an URL index table, and managing the association relation of the corresponding URL with the original web page URL.

The hidden URL detection and extraction module 616a detects that a portion on which the URL link is displayed has a size of 0 or width×depth<=10 or that the connected window is not displayed.

The hidden URL detection and extraction module 616a checks the iFrame portion of the collected web page source, collects the src address corresponding to the above-mentioned conditions in size, performs the in-depth crawling for the corresponding URL, manages the extracted src address in the URL index table, and manages the association relation of the corresponding URL with the original web page (from which the src address is extracted) URL.

In this case, if the managed URL is shortened URL, redirection to the original URL upon the approach to the corresponding shortened URL is generated, and the original URL is contained in the corresponding redirection.

Figure 3:
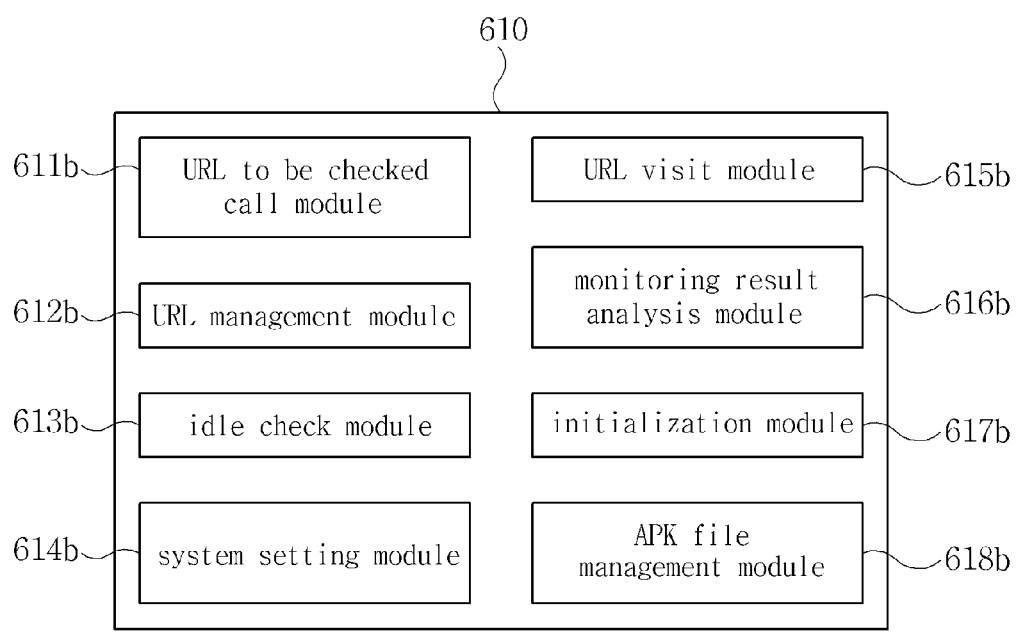
FIG. 3 is a block diagram showing another configuration of FIG. 2.

FIG. 3 is a block diagram showing another configuration of FIG. 2.

As shown in FIG. 3, the URL analysis module 610 includes: a URL to be checked call module 611b calling the URL whose dynamic analysis is not performed from the collected URLs, the URL whose static analysis is finished, and the drive-by download URLs, calling the repeated URLs collected after the re-analysis limitation period from the repeatedly collected URLs, and performing the dynamic analysis for the called URLs; a URL management module 612b checking whether the URLs for the dynamic analysis are the shortened URLs and managing the checked original URLs and the shortened URL information for the original URLs; an idle check module 613b checking whether the emulator and terminal for the dynamic analysis of the URLs are idle; a system setting module 614b transmitting the URL to be checked to the dynamic analysis instrument, activating Wi-Fi function in case of the mobile terminal, checking whether network is connected to a management system, and receiving the URL to be checked; a URL visit module 615b calling the basic browser of the emulator or terminal, inputting the URL to be checked, activating all monitoring functions after the input of the URL, performing the connection of the URL, setting the emulator or terminal to apply no external manipulation thereto, and performing visiting to the URL; a monitoring result analysis module 616b checking the visit to the URL and transmitting the values of the monitoring results to the management system; an initialization module 617b performing the initialization to the state before the visit if the extraction of the monitoring results is finished; and an APK file management module 618b performing repetition collection checking whether the collected APK files are the same as the existing collected APK files, adding the URL visited and checked and the collection time to the existing APK collection traceability if the collected APK files are repeated, producing and managing APK index by using index table if the collected APK files are new, and producing collection information.

The URL management module 612b manages the shortened URL information based on the original URLs since a plurality of shortened URLs exists in one original URL.

The idle check module 613b basically performs the analysis using the emulator, and if there is no idle emulator, it performs the analysis using the terminal.

If the idle check module 613b detects the information approaching to specific resources possessed by the terminal upon the analysis using the emulator, it performs the analysis using the terminal after the analysis using the emulator. In this case, the specific resources include communication, messaging, camera, GPS and the like.

If the idle check module 613b checks the idle emulator and terminal, it initializes the corresponding analysis environment and sets it as the state where the visit to URL is available.

The system setting module 614b performs network traffic collection by driving the traffic dump program for the network traffic monitoring of the server on which the emulator is operated, by operating network traffic dump program on the mobile terminal, or by using Wi-Fi traffic dump program configured in an NAT environment.

The system setting module 614b performs the monitoring on the production of the file on the path through which the APK is downloaded in the Android file system, receives the URL visit check time according to the setting of the management system, and performs the monitoring for the corresponding time.

If the APK file is detected as a result of the monitoring on the Android file system, the monitoring result analysis module 616b transmits the corresponding file to the management system, and if no APK file is detected, informs the management system that no APK file is detected. At this time, the management system should check that the received APK file is received from the real URL visit check instrument. That is, the checking is conducted by using previously set conditions, that is, by comparing hash values.

The monitoring result analysis module 616b transmits the network monitoring result to the management system, and the management system analyzes the corresponding network dump to check whether the APK file is transmitted.

If it is checked that the APK file is transmitted, the monitoring result analysis module 616b extracts the corresponding APK file and checks whether the APK file is the same as the collected APK file through the file system monitoring. If it is checked that the APK file is not the same as the collected APK file, all APK files should be stored, analyzed and managed in the management server, and the network monitoring dump is kept and managed for follow-up analysis.

The APK file management module 618b checks the existing URL check traceability for the URL to be visited and checked from which the APK file is produced and connects and manages the checked result with the APK collection results.

Figure 4:
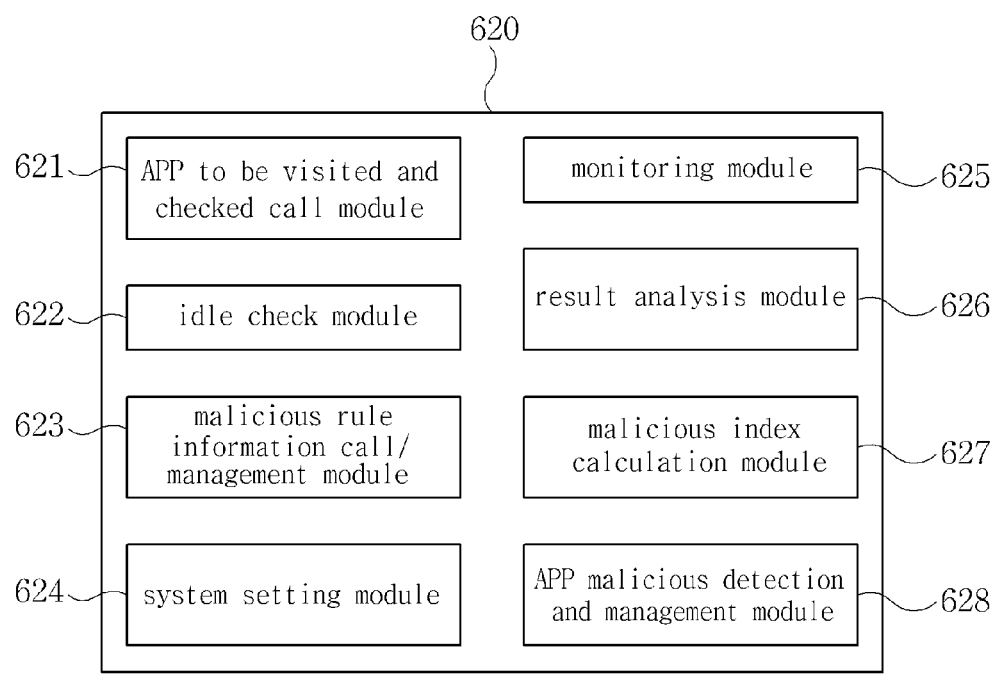
FIG. 4 is a block diagram showing the detailed configuration of an app analysis module in FIG. 1.

FIG. 4 is a block diagram showing the detailed configuration of an application analysis module in FIG. 1

As shown in FIG. 4, the application analysis module 620 includes: an APP to be visited and checked call module 621 calling the APP produced from the APP collection result and URL/APP analysis result; an idle check module 622 checking whether the emulator and terminal for the APP dynamic analysis are idle, first performing the analysis using the emulator, and next performing the analysis using the terminal if there is no idle emulator; a malicious rule information call/management module 623 calling APP behavior malicious rule set by the manager and analyzing the APP behavior monitoring result; a system setting module 624 transmitting the APP to be checked to the dynamic analysis instrument; a monitoring module 625 checking the APP received from the management system, executing monitoring processes, and recording the information on all behaviors produced when the APP is installed or operated as log; a result analysis module 626 transmitting the log produced from the monitoring processes after the APP analysis time is finished to the management system; a malicious index calculation module 627 checking the malicious behaviors of the APP to be checked through mobile vaccine like VirusTotal and AndroTotal, obtaining external reputation information on the APP to be checked by using the detected results from the mobile vaccine, and calculating the malicious score; and an APP malicious detection and management module 628 calculating the malicious score based on the malicious score calculated through one of the monitoring result and the mobile vaccine, recording and managing the calculated score in a DB, and providing the malicious detection result.

The visit check APP call module 621 calls the previously checked APP as a check object upon the request for the re-analysis of the previously checked APP, sets the checked APP as the highest analysis priority, and first performs the checked APP if idle instrument exists.

The idle check module 622 first performs the analysis using the emulator if the information approaching the specific resources possessed by the terminal is detected upon the analysis using the emulator, then performs the analysis using the terminal, initializes the corresponding analysis environment if the idle emulation and terminal are checked, and sets the corresponding analysis environment as the state where the APP analysis is applicable.

The malicious rule information call/management module 623 provides an interface to allow the manager to input the information on the APP malicious behavior and stores and manages the information on the APP malicious behavior provided by the interface in a DB. At this time, the information on the APP malicious behavior can be corrected and deleted in the system.

The system setting module 624 activates the Wi-Fi function in case of the mobile terminal, checks the network connect with the management system, and receives the APP to be checked.

The system setting module 624 performs network traffic collection by driving the traffic dump program for the network traffic monitoring of the server on which the emulator is operated, by operating network traffic dump program on the mobile terminal, or by using Wi-Fi traffic dump program configured in an NAT environment.

The system setting module 624 performs the monitoring on the production of the file on the path through which the APK is downloaded in the Android file system and performs the hooking of main target processes for the process monitoring of the emulator and terminal.

The system setting module 624 monitors the C Library call for the detection of Native malicious code and collects the malicious behavior executed in the area except Java area through the monitoring.

The system setting module 624 performs Android memory hooking to detect the malicious behavior through the memory, traces the changed traceability, receives the APP visit check time according to the setting of the management system, and performs the monitoring during the corresponding time.

The monitoring module 625 generates virtual user interaction for the analysis of APP, and the time for the analysis of APP is made by the value set in the management system. Basically, the behavior information is recorded and analyzed for 3 minutes.

If APP is additionally downloaded or produced during the analysis of APP, the result analysis module 626 transmits the corresponding information to the management system, checks the repetition collection of the additionally detected APP, adds and manages the collection traceability in case of the repeatedly collected APP, and performs the analysis of the APP in the highest priority in case of newly collected APP.

The result analysis module 626 calculates the malicious score for the APP behavior through the comparison between the monitoring results and the malicious behavior rules and calculates the malicious score of the APP by using the signature and authorization information of the APP (the information collected upon the collection of APPs).

Under the above-mentioned configuration, an explanation on a method for analyzing mobile cyber incidents will be given below.

(JavaScript Obfuscation Check Routine)

Figure 5:
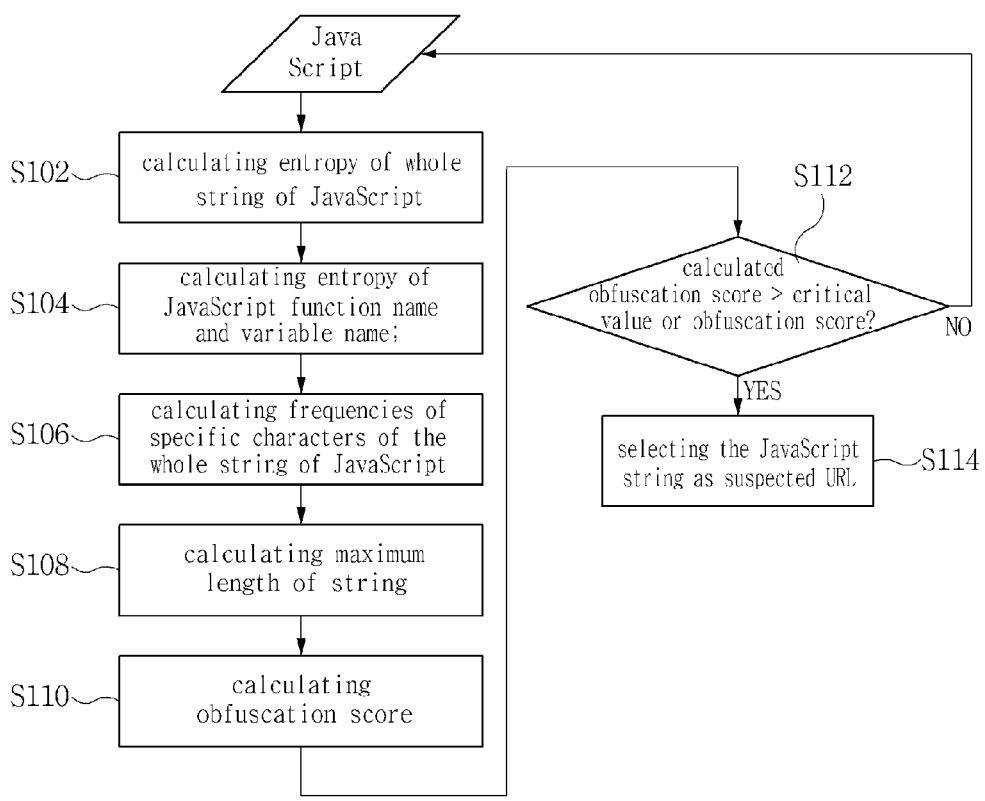
FIG. 5 is a flow chart showing a JavaScript obfuscation checking routine in a method for analyzing mobile cyber incidents according to the present invention.

FIG. 5 is a flow chart showing a JavaScript obfuscation check routine in a method for analyzing mobile cyber incidents according to the present invention.

As shown in FIG. 5, the mobile incident analysis server 600 calculates the entropy of the whole string of the JavaScript collected by the mobile incident collection server 500 (at step S102), calculates the entropy of JavaScript function name and variable name (at step S104), and calculates the frequencies of specific characters of the whole string of the JavaScript (at step S106).

Next, the mobile incident analysis server 600 calculates the maximum length of the string (at step S108) and calculates the obfuscation score (at step S110).

After that, the mobile incident analysis server 600 determines whether the calculated obfuscation score is larger than a critical value or an obfuscation score (reference value) (at step S112), and if larger, the mobile incident analysis server 600 selects the JavaScript string as suspected URL (at step S114).

(URL Visit Checking Emulator/Terminal Check and URL Transmission Routine)

Figure 6:
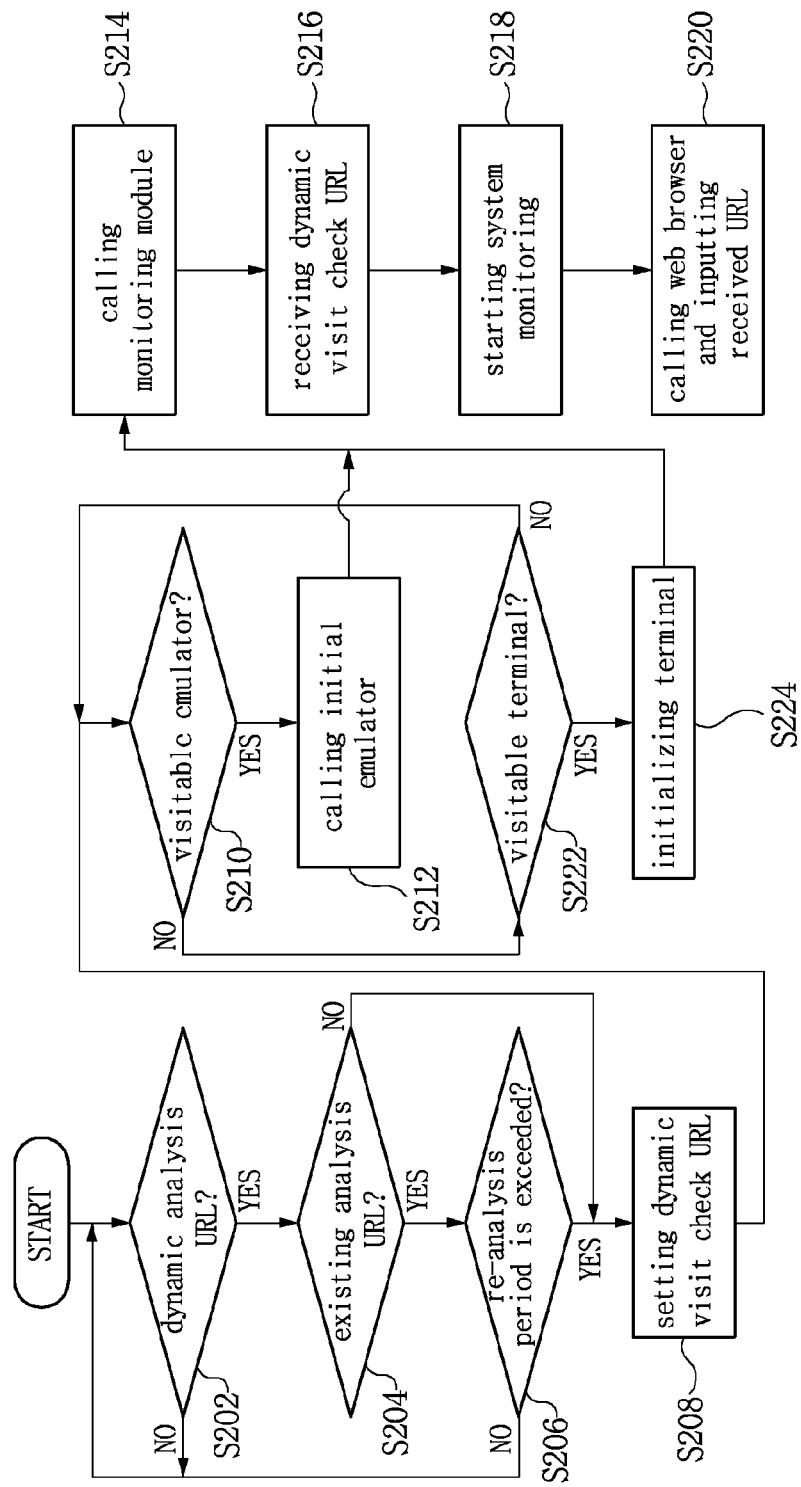
FIG. 6 is a flow chart showing a URL visit checking emulator/terminal checking and URL transmitting routine in the method for analyzing mobile cyber incidents according to the present invention.

FIG. 6 is a flow chart showing a URL visit checking emulator/terminal check and URL transmission routine in the method for analyzing mobile cyber incidents according to the present invention.

As shown in FIG. 6, the mobile incident analysis server 600 determines whether the URLs collected by the mobile incident collection server 500 are the dynamic analysis standby URLs (at step S202), and if so, determines whether the URLs collected are existing analysis URLs (at step S204).

If it is determined that the URLs collected are existing analysis URLs, the mobile incident analysis server 600 determines whether a re-analysis period is exceeded (at step S206), and if so, sets the collected URLs as the dynamic visit check URLs (at step S208).

Next, the mobile incident analysis server 600 determines whether the dynamic visit check URLs are visitable emulators (at step S210), calls initial emulators if so (at step S212), calls a monitoring module (at step S214), receives the dynamic visit check URLs (at step S216), starts system monitoring (at step S218), and calls web browser and inputs the received URL (at step S220).

If it is determined that the dynamic visit check URLs are not visitable emulators (at step S210), the mobile incident analysis server 600 determines whether the dynamic visit check URLs are visitable terminals (at step S222), initializes the terminal if so (at step S224), calls the monitoring module (at step S214), receives the dynamic visit check URLs (at step S216), starts system monitoring (at step S218), and calls web browser and inputs the received URL (at step S220).

(Monitoring and Produced APK Detection/Management Routine)

Figure 7:
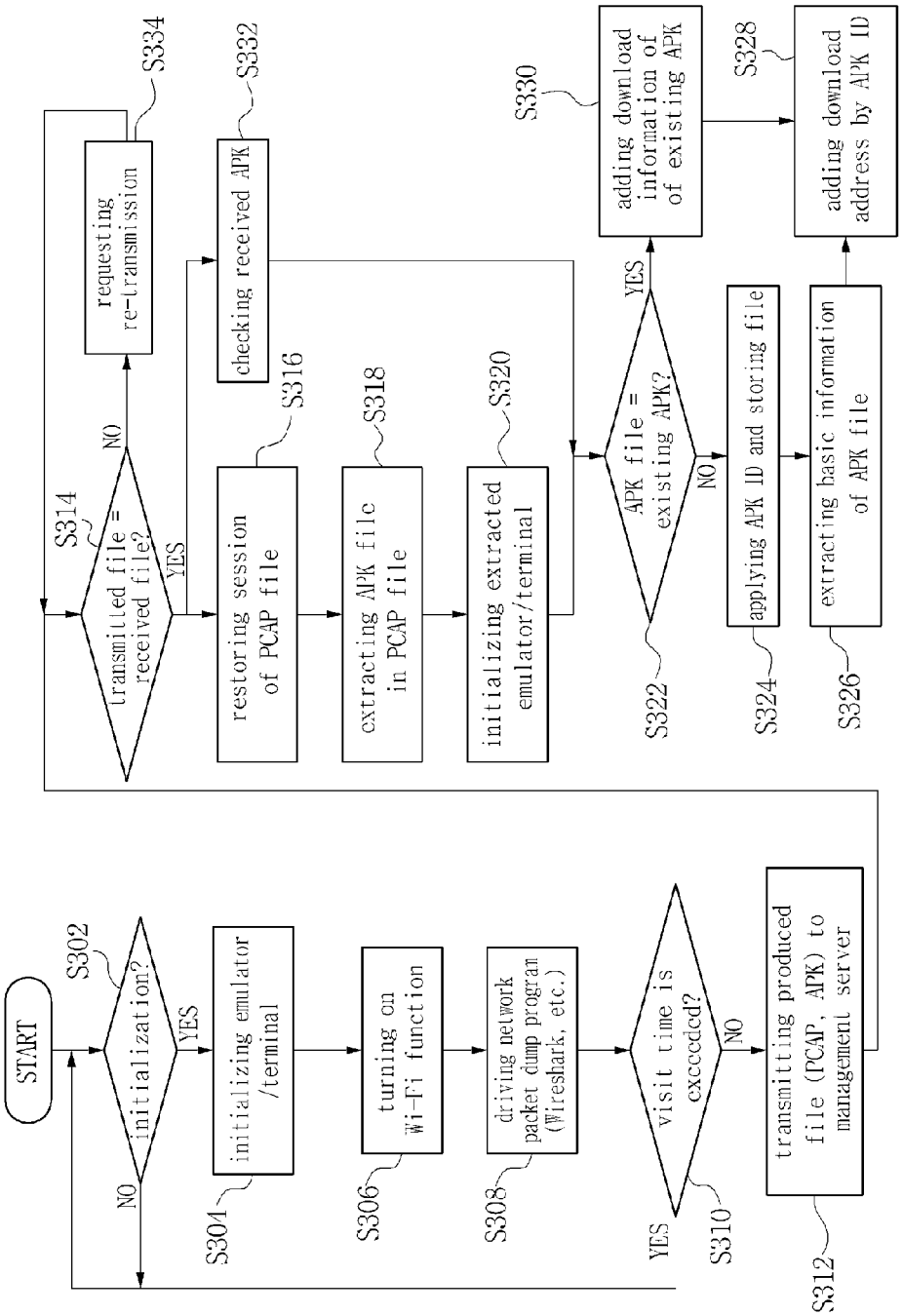
FIG. 7 is a flow chart showing a monitoring and produced APK detecting/managing routine in the method for analyzing mobile cyber incidents according to the present invention.

FIG. 7 is a flow chart showing a monitoring and produced APK detection/management routine in the method for analyzing mobile cyber incidents according to the present invention.

As shown in FIG. 7, the mobile incident analysis server 600 determines whether an initialization command is inputted from the outside (at step S302), initializes the analysis environment for the emulator and terminal if it is determined that the initialization command is inputted to transform the corresponding analysis environment into the state where the visit to URL is possible (at step S304).

The mobile incident analysis server 600 turns on the Wi-Fi function after the initialization of the analysis environment for the terminal (at step S306) and drives a network packet dump program (at step S308).

Next, the mobile incident analysis server 600 determines whether the visit time is exceeded (at step S310), and if not, transmits the file produced as the monitoring result to the management system (at step S312).

The mobile incident analysis server 600 determines whether the transmitted file corresponds to the received file in the management system (at step S314), restores the session of PCAP file if so (at step S316), extracts the APK file in the PCAP file (at step S318), and initializes the extracted emulator and terminal (at step S320).

The mobile incident analysis server 600 determines whether the extracted APK file is the existing APK file (at step S322), applies ID to the extracted APK file if it is determined that the extracted APK file is not the existing APK file and stores the file (at step S324), extracts the basic information of the APK file (at step S326), and adds the download address by ID of APK (at step S328).

If it is determined that the extracted APK file is the existing APK file, the mobile incident analysis server 600 adds the download information of the existing APK file (at step S330) and adds the download address by ID of APK (at the step S328).

On the other hand, if it is determined that the transmitted file is the APK file (at step S332), the mobile incident analysis server 600 returns to the step S322.

If it is determined that the transmitted file is different from the received file at the step S314, the mobile incident analysis server 600 performs re-transmission request (at step S334).

(Check Instrument Confirmation and APP Behavior Analysis Preparation Routine)

Figure 8:
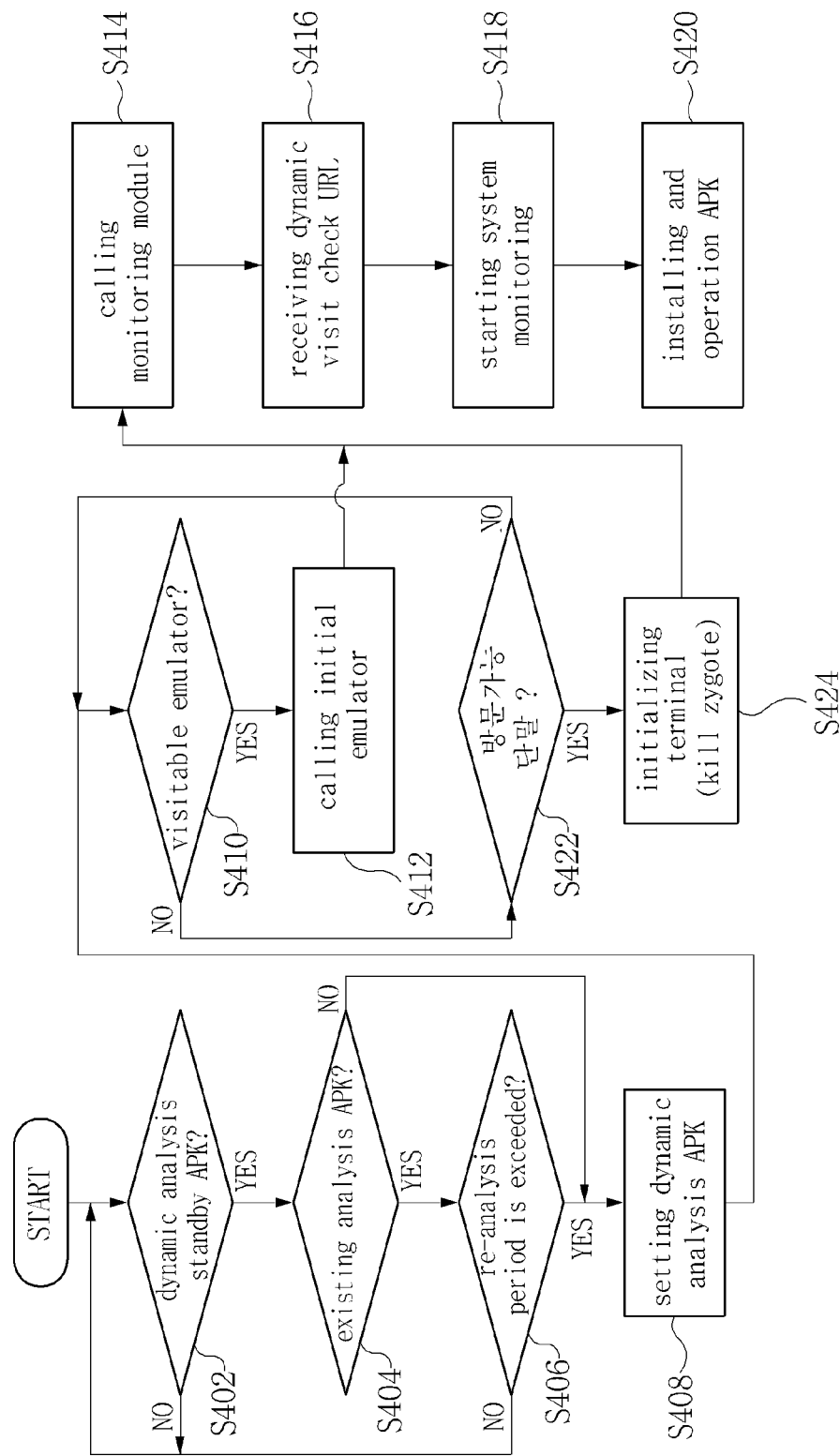
FIG. 8 is a flow chart showing a check instrument confirming and APP behavior analysis preparing routine in the method for analyzing mobile cyber incidents according to the present invention.

FIG. 8 is a flow chart showing a check instrument confirmation and APP behavior analysis preparation routine in the method for analyzing mobile cyber incidents according to the present invention.

As shown in FIG. 8, the mobile incident analysis server 600 determines whether the APK collected by the mobile incident collection server 500 is dynamic analysis standby APK (at step S402), determines whether the APK collected is existing analysis APK if so (at step S404), determines whether a re-analysis period is exceeded if it is determined that the APK is existing analysis APK (at step S406), and sets the collected APK as the dynamic analysis APK if it is determined that the re-analysis period is exceeded (at step S408).

Next, the mobile incident analysis server 600 determines whether the dynamic analysis APK is a visitable emulator (at step 410), calls an initial emulator if so (at step S412), calls a monitoring module (at step S414), receives the dynamic analysis APK (at step S416), starts system monitoring (at step S418), and installs and operates the APK (at step S420).

If it is determined that the dynamic analysis APK is not visitable emulator (at the step S410), the mobile incident analysis server 600 determines whether the dynamic analysis APK is a visitable terminal (at step S422), initializes the terminal if so (at step S424), calls the monitoring module (at step S414), receives the dynamic analysis APK (at step S416), starts system monitoring (at step S418), and installs and operates the APK (at step S420).

(Process Monitoring Routine)

Figure 9:
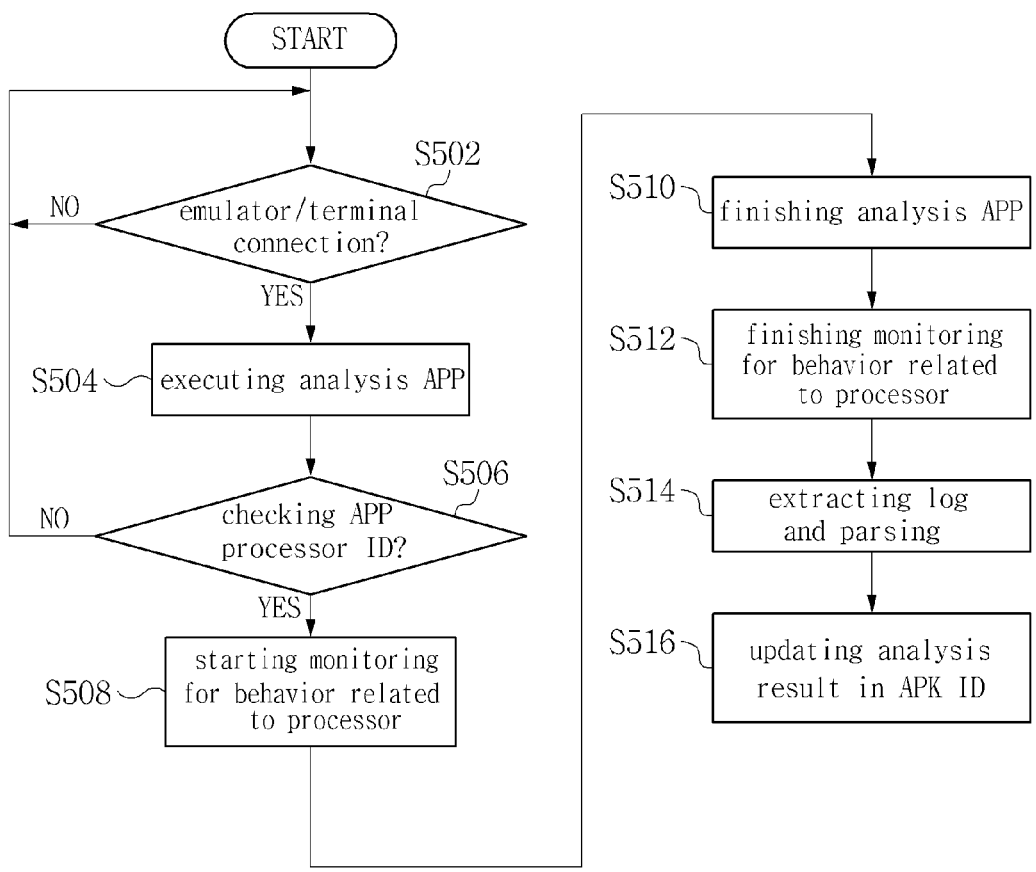
FIG. 9 is a flow chart showing a process monitoring routine in the method for analyzing mobile cyber incidents according to the present invention.

FIG. 9 is a flow chart showing a process monitoring routine in the method for analyzing mobile cyber incidents according to the present invention.

As shown in FIG. 9, the mobile incident analysis server 600 determines whether the emulator or terminal is connectable (at step S502), and executes an analysis APP if it is determined that the emulator or terminal is connectable (at step S504).

Next, the mobile incident analysis server 600 checks the processor ID of the APP to be executed (at step S506), starts the monitoring for the behavior related to the processor on the basis of the processor ID of the APP checked (at step S508), finishes the analysis APP (at step S510), finishes the monitoring for the behavior related to the processor (at step S512), extracts log and performs parsing (at step S514), and updates the analysis result in the APK ID (at step S516).

(File System and Network Monitoring Routine)

Figure 10:
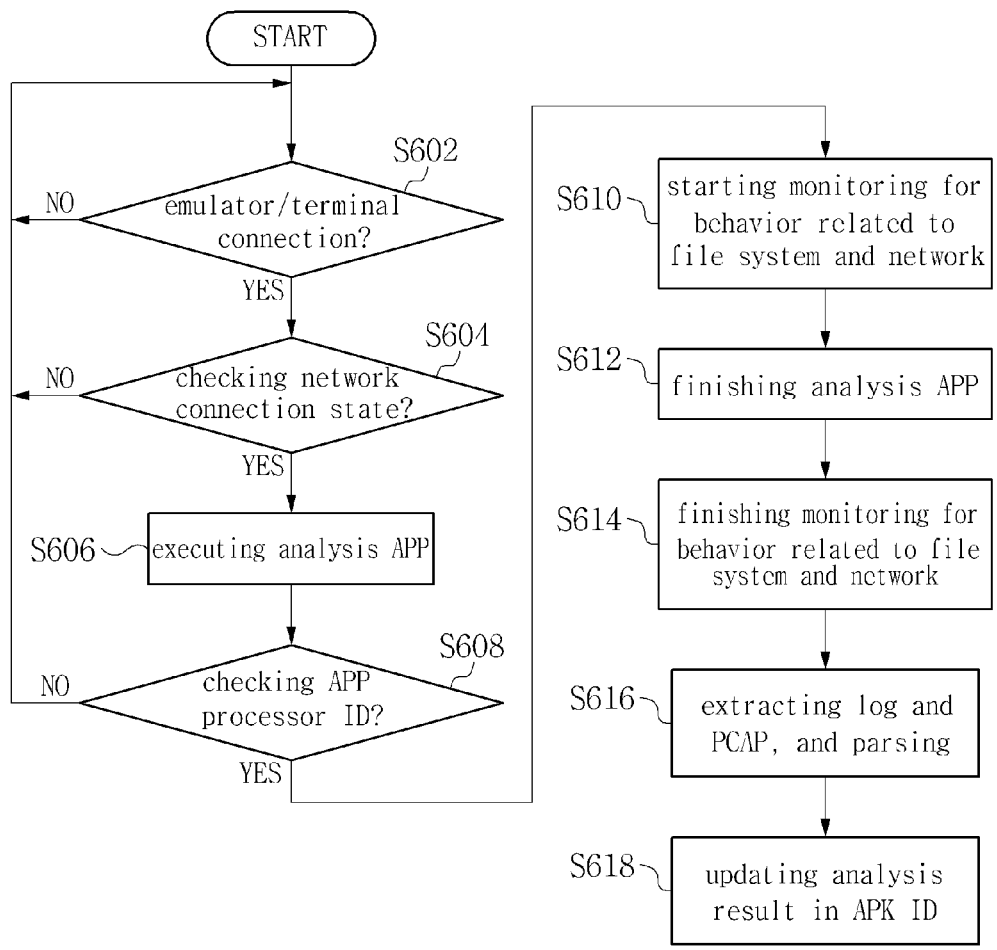
FIG. 10 is a flow chart showing a file system and network monitoring routine in the method for analyzing mobile cyber incidents according to the present invention.

FIG. 10 is a flow chart showing a file system and network monitoring routine in the method for analyzing mobile cyber incidents according to the present invention.

As shown in FIG. 10, the mobile incident analysis server 600 determines whether the emulator or terminal is connectable (at step S602), checks the connection state of network if it is determined that the emulator or terminal is connectable (at step S604), and executes an analysis APP if it is checked that the network is connected (at step S606).

Next, the mobile incident analysis server 600 checks the processor ID of the APP executed (at step S608) and starts the monitoring for the file system or the behavior related to the network (at step S610).

After that, the mobile incident analysis server 600 finishes the analysis APP (at step S612), finishes the monitoring for the file system or the behavior related to the network (at step S614), extracts log and PCAP and performs parsing (at step S616), and updates the analysis result in the APK ID (at step S618).

(Monitoring Result Analysis Routine)

Figure 11:
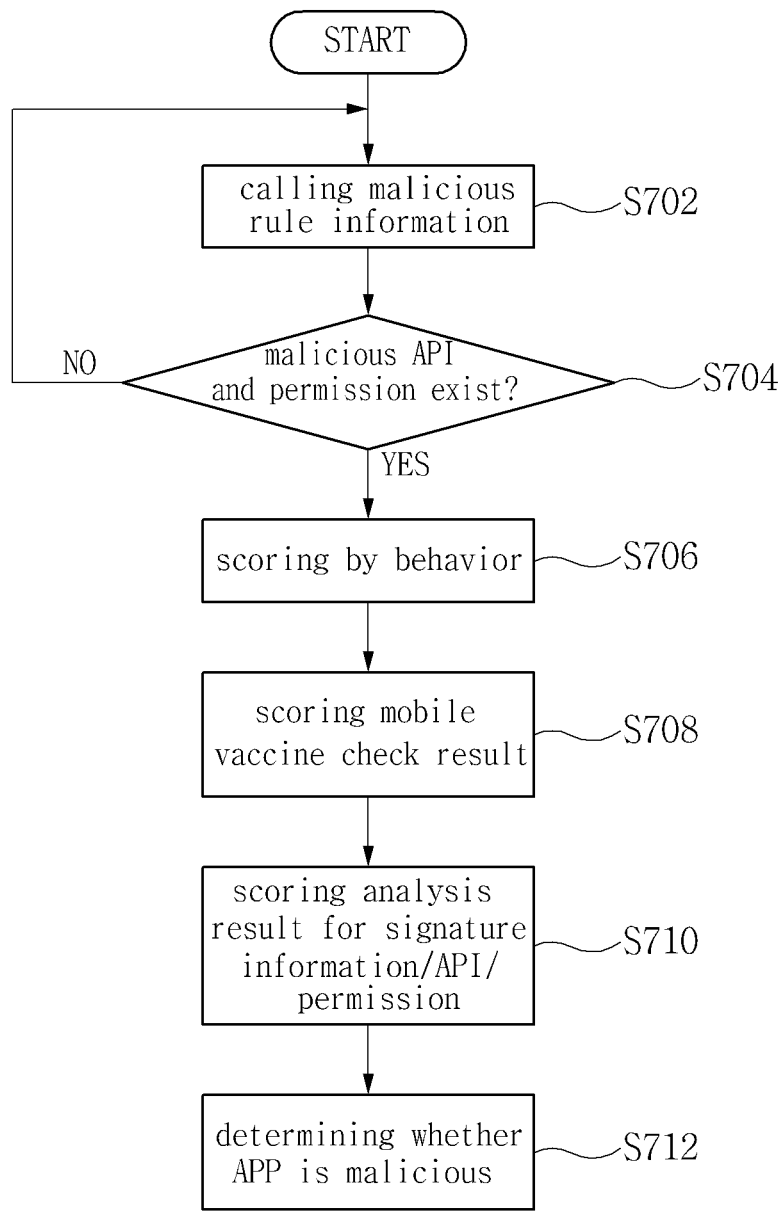
FIG. 11 is a flow chart showing a monitoring result analysis routine in the method for analyzing mobile cyber incidents according to the present invention.

FIG. 11 is a flow chart showing a monitoring result analysis routine in the method for analyzing mobile cyber incidents according to the present invention.

As shown in FIG. 11, the mobile incident analysis server 600 calls malicious rule information on the basis of the monitoring result of the APP analysis (at step S702) and determines whether malicious API and permission exist (at step S704).

If it is determined that the malicious API and permission exist, the mobile incident analysis server 600 performs the scoring by behavior (at step S706), performs the scoring for the mobile vaccine check result (at step S708), performs the scoring for the signature information, API and agreement analysis results (at step S710), and determines whether the APP is malicious or not (at step S712).

(Mobile Vaccine Check and Result Analysis Routine)

Figure 12:
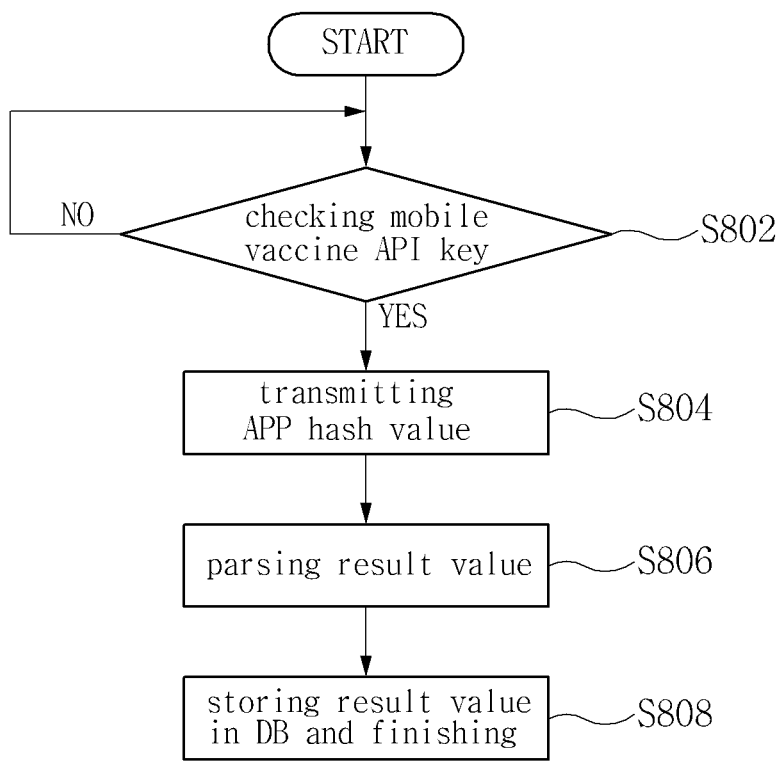
FIG. 12 is a flow chart showing a mobile vaccine checking and result analysis routine in the method for analyzing mobile cyber incidents according to the present invention.

FIG. 12 is a flow chart showing a mobile vaccine checking and result analysis routine in the method for analyzing mobile cyber incidents according to the present invention.

As shown in FIG. 12, the mobile incident analysis server 600 checks mobile vaccine API KET on the basis of the monitoring result of the APP analysis (at step S802), transmits an APP hash value if it is checked that the mobile vaccine API KET is detected (at step S804), parses the result value (at step S806), and stores and finishes the result value of the parsing in a DB (at step S808).

As described above, the system and method for analyzing mobile cyber incidents according to the present invention checks whether codes attacking the weaknesses of mobile users are inserted into collected URLs and whether applications are downloaded and automatically executed, without the agreement of users, so that if the mobile cyber incidents are analyzed through the manual analysis of a manager, the applications to be analyzed manually can be reduced.

Furthermore, the system and method for analyzing mobile cyber incidents according to the present invention provides the stability in application analysis and the sharing system in the detected information, thus dynamically handling the mobile cyber incidents to occur.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A system for analyzing mobile cyber incidents, the system comprising:

a mobile incident collection server, comprising one or more hardware processor, collecting text messages sent through communication company servers to produce text message detection information, collecting Uniform Resource Locator, URL, information based on real-time search words provided by search portals to produce URL detection information, and collecting basic information of application files being sold in application market servers to produce Android Application Package, APK, detection information;

a mobile incident analysis server, comprising one or more hardware processor, having a URL analysis module checking whether codes attacking the weaknesses of mobile users are inserted into collected URLs or checking whether applications are downloaded and automatically executed, without the agreement of users, on the basis of the URL detection information collected by the mobile incident collection server to produce and provide URL analysis information and an application analysis module determining whether malicious behaviors exist on the basis of the APK detection information collected by the mobile incident collection server to produce and provide application analysis information; and an analysis information database receiving the URL analysis information and the application analysis information produced by the mobile incident analysis server and storing and managing the information therein;

wherein the URL analysis module comprises: a URL call module receiving a URL list to be collected from the mobile incident collection server and, if collected URLs exist, analyzing the collected URLs;

a crawler and header setting call module checking the terminal information approaching the URLs by using user agent information of header information of operating system, OS, and calling pages different from each other;

a URL web source crawling module crawling the URL web sources called by the crawler and header setting call module;

a URL link extraction module detecting the URL link information of the web page sources crawled and performing the in-depth crawling for the corresponding URLs;

an obfuscation checking and scoring module checking the maximum length of a single string, frequencies and entropy of specific characters, and the entropy of the whole function name and variable name, calculating the scores of the checked items, determining that the corresponding URLs are obfuscated if the corresponding page exceeds a critical value, setting the URL obfuscated as drive-by download page, and performing the dynamic checking for the URL;

a hidden URL detection and extraction module detecting hidden URL as features of the drive-by download page attack; and an APK URL detection module analyzing whether the APK file downloaded by the visit to the corresponding URL through the web page source analysis exists, extracting the corresponding URL, analyzing the extracted URL information, extracting the corresponding URL if the final extension of the corresponding URL is APK, managing the corresponding URL in an URL index table, and managing the association relation of the corresponding URL with the original web page URL;

wherein the hidden URL detection and extraction module detects that a portion on which the URL link is displayed has a size of 0 or width times depth<=10 or that the connected window is not displayed.

2. The system according to claim 1, wherein the application analysis module performs mobile vaccine checking whether the existing malicious behaviors are detected in the applications collected by the mobile incident collection server, collects and provides malicious behavior detection vaccine information and detected name information according to the checking results, and performs the behavior analysis for the applications being normal on the behaviors as the checking results.

3. The system according to claim 2, wherein the behavior analysis is the application analysis using a mobile terminal and the application analysis using an emulator.

4. The system according to claim 1, wherein the URL analysis module comprises:
a URL to be checked call module calling the URL whose dynamic analysis is not performed from the collected URLs, the URL whose static analysis is finished, and the drive-by download URLs, calling the repeated URLs collected after the re-analysis limitation period from the repeatedly collected URLs, and performing the dynamic analysis for the called URLs;
a URL management module checking whether the URLs for the dynamic analysis are the shortened URLs and managing the checked original URLs and the shortened URL information for the original URLs;
an idle check module checking whether the emulator and terminal for the dynamic analysis of the URLs are idle;
a system setting module transmitting the URL to be checked to the dynamic analysis instrument, activating Wi-Fi function in case of the mobile terminal, checking whether network is connected to a management system, and receiving the URL to be checked;
a URL visit module calling the basic browser of the emulator or terminal, inputting the URL to be checked, activating all monitoring functions after the input of the URL, performing the connection of the URL, setting the emulator or terminal to apply no external manipulation thereto, and performing visiting to the URL;
a monitoring result analysis module checking the visit to the URL and transmitting the values of the monitoring results to the management system;
an initialization module performing the initialization to the state before the visit if the extraction of the monitoring results is finished; and
an APK file management module performing repetition collection checking whether the collected APK files are the same as the existing collected APK files, adding the URL visited and checked and the collection time to the existing APK collection traceability if the collected APK files are repeated, producing and managing APK index by using index table if the collected APK files are new, and producing collection information.

5. The system according to claim 1, wherein the application analysis module comprises:
an application, APP, to be visited and checked call module calling the APP produced from the APP collection result and URL/APP analysis result;
an idle check module checking whether the emulator and terminal for the APP dynamic analysis are idle, first performing the analysis using the emulator, and next performing the analysis using the terminal if there is no idle emulator;
a malicious rule information call/management module calling APP behavior malicious rule set by the manager and analyzing the APP behavior monitoring result; a system setting module transmitting the APP to be checked to the dynamic analysis instrument; a monitoring module checking the APP received from the management system, executing monitoring processes, and recording the information on all behaviors produced when the APP is installed or operated as log;
a result analysis module transmitting the log produced from the monitoring processes after the APP analysis time is finished to the management system;
a malicious index calculation module checking the malicious behaviors of the APP to be checked through mobile vaccine, obtaining external reputation information on the APP to be checked by using the detected results from the mobile vaccine, and calculating the malicious score; and
an APP malicious detection and management module calculating the malicious score based on the malicious score calculated through one of the monitoring result and the mobile vaccine, recording and managing the calculated score in a database, and providing the malicious detection result.

* * * * *